United States Patent [19]

Kunde et al.

[11] 4,317,233
[45] Feb. 23, 1982

[54] TELEPHONE SUBSCRIBER STATION

[75] Inventors: Gerhard Kunde, Munich; Siegfried Schoen, Starnberg; Herwig Trimmel, Puchheim, all of Fed. Rep. of Germany

[73] Assignee: Siemens Aktiengesellschaft, Berlin & Munich, Fed. Rep. of Germany

[21] Appl. No.: 197,561

[22] Filed: Oct. 16, 1980

[30] Foreign Application Priority Data

Oct. 30, 1979 [DE] Fed. Rep. of Germany ....... 2943867

[51] Int. Cl.³ .............................................. H04B 9/00
[52] U.S. Cl. ..................................... 455/606; 455/617
[58] Field of Search ........................ 455/606, 607, 617

[56] References Cited

U.S. PATENT DOCUMENTS 3,710,122  1/1973  Burcher ..................... 455/606

FOREIGN PATENT DOCUMENTS 2823931  12/1979  Fed. Rep. of Germany

*Primary Examiner*—Howard Britton
*Attorney, Agent, or Firm*—Hill, Van Santen, Steadman, Chiara & Simpson

[57] ABSTRACT

A telephone subscriber station has a base set and a cordless hand set. The transmission between the base and hand set occurs by way of infrared transmitters and infrared receivers. Pulse phase modulation who is particularly suited for the speech transmission. Various functions are remotely controlled from the cordless hand set by the transmission of special characters. The special characters are transmitted as pulse sequences having differing frequencies. Thereby, a specific frequency is assigned to each special character. A call device comprises keys and a controllable pulse generator. A frequency recognition circuit is provided in the receiver at the base set and assigns the received pulse sequences to the special characters and has corresponding control functions. A monitoring circuit monitors the synchronization between the hand set and the base set and disconnects the telephone connection given a transmission which is disrupted over a longer interval.

11 Claims, 6 Drawing Figures

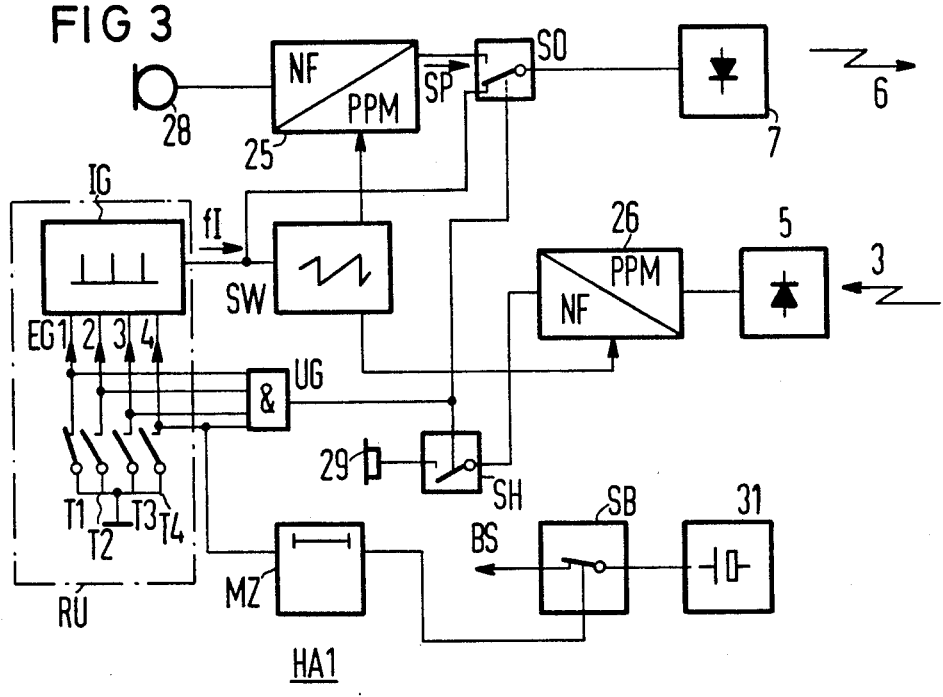
FIG 3
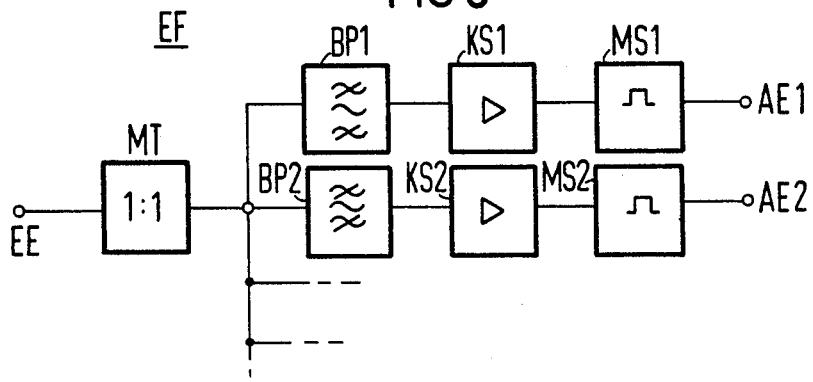
FIG 5
FIG 6

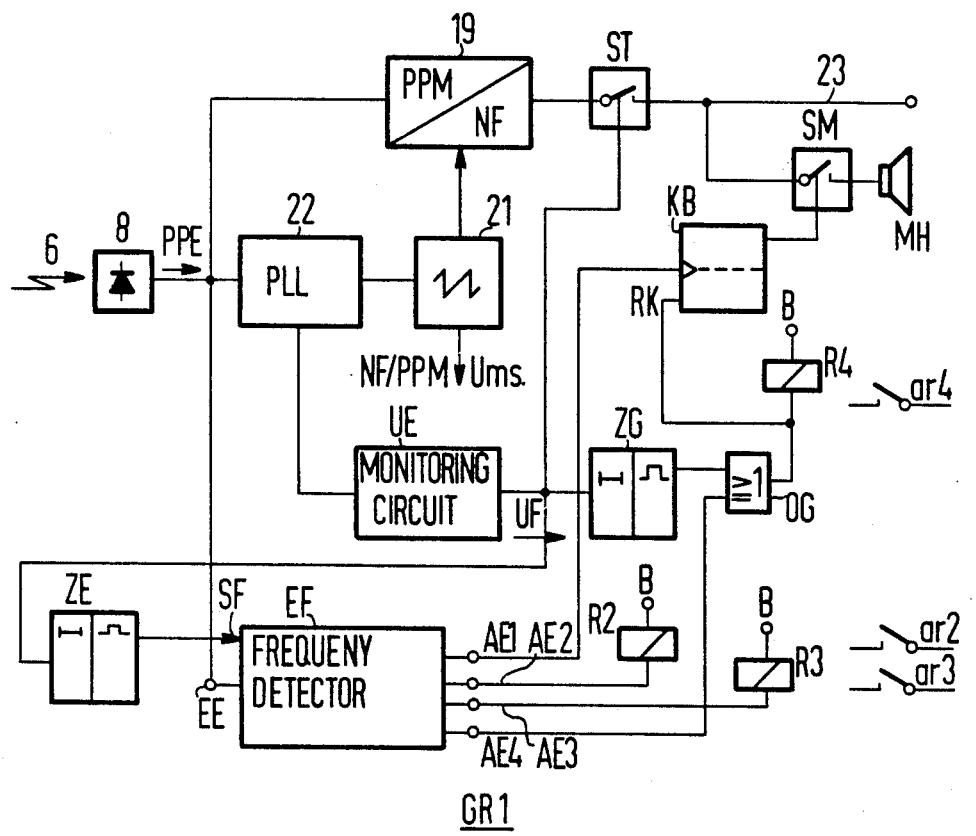

TELEPHONE SUBSCRIBER STATION

BACKGROUND OF THE INVENTION

1. Field of the Invention

The present invention relates to a telephone subscriber station having a base set connected to the telephone network and a cordless hand set, having a first transmission segment which contains a first NF/PPM converter and a first IR pulse transmitter in the base set and, connected by way of a first optical transmission channel, a first IR pulse receiver and a first NF/PPM converter in the cordless hand set, and also having a second transmission path which contains a second NF/PPM converter and a second IR pulse transmitter in the cordless hand set and, connected via a second optical transmission channel, a second IR pulse receiver and a second PPM/NF converter in the base set, with a phase synchronization circuit in the base set and a call device in the hand set.

2. Description of the Prior Art

Such a telephone subscriber station is, in general, known in the art. Its manner of operation will be described below on the basis of FIGS. 1 and 2, in which FIG. 1 is a block diagram of a telephone subscriber station and FIG. 2 is a pulse diagram for the pulse phase modulation employed in the subscriber station.

The abbreviations employed herein are defined as:
PPM = Pulse phase modulation;
NF = Low frequency;
MFV = Multi-frequency method;
IWV = Pulse selection method; and
IR = Infrared.

The telephone subscriber station of FIG. 1 comprises a base set 1 and a cordless hand set 2.

The base set 1 comprises an IR pulse transmitter 4, an IR pulse receiver 8, a PPM/NF converter 19, and an NF/PPM converter 20, a sawtooth generator 21, a delay circuit 22, a power supply 24, and, optionally, the telephone apparatus 15 with a cord and a dialing structure 12.

The cordless hand set 2 contains an IR pulse transmitter 7, an IR pulse receiver 5, an NF/PPM converter 25, a PPM/NF converter 26, a sawtooth generator 27, a microphone 28, a telephone receiver 29, a calling or dialing structure 30 and a power supply 31.

When a speech signal arrives on the leads 23 of the subscriber line, the same is converted into PPM signals in the NF/PPM converter 20 and is emitted by way of the IR pulse transmitter 4 into the optical transmission channel 3. This signal is received in the IR pulse receiver 5 and is relayed by way of the PPM/NF converter 26 to the telephone receiver 29. A reply returns to the leads 23 of the subscriber line via the microphone 28, the NF/PPM converter 25, the IR pulse transmitter 7, the optical transmission channel 6, the IR pulse receiver 8 and the PPM/NF converter 19.

A dialing device can be located in the base set 1 and/or in the cordless hand set 2. The arrangement 30 in the cordless hand set 2 can be either a multi-frequency or dial pulse device. It it is only a matter of a call device, then the dialing of the telephone called party must be carried out by a person at the base set. If the arrangement 30, however, is a dialing (MF or dial pulse) device, then the called party can be directly dialed.

NF/PPM and PPM/NF converters are standard components. In the NF/PPM converter, pulses of identical size are diverted from the periodically returning neutral position in accordance with the amplitude of the NF signal. Thereby, the chronological deflection is proportional to the NF signal. The PPM/NF converter reconverts the phase fluctuations into voltage values, i.e. into the original NF signal. The NF/PPM and PPM/NF conversion expediently occurs with the assistance of a saw tooth generator.

The NF/PPM converter 25, as well as the PPM/NF converter 26 are driven from a common sawtooth generator 27, and the NF/PPM converter 20 as well as the PPM/NF converter 19 are driven by the common sawtooth generator 21. The synchronization of the sawtooth generator 21 with the sawtooth generator 27 occurs via the delay circuit 22.

FIG. 2 illustrates a pulse diagram for the PPM transmission between the hand set and the base set.

The sawtooth wave form c is generated by the free-running sawtooth generator 27 of the hand set, while the sawtooth wave form g is generated by the entrained sawtooth generator 21 of the base set. A sawtooth period of, for example, 125 $\mu$s is divided into two channels K1 and K2. PPM pulses are transmitted from the handset to the base set in the channel K1 and PPM pulses are transmitted from the base set to the hand set in the channel K2. A PPM pulse a is transmitted by the IR pulse generator 7 of the hand set and, now referenced d, it is received by the IR pulse receiver 8 of the base set. The PPM pulse e is transmitted by the IR pulse transmitter 4 of the base set; this, now being referenced on the receiving side as b, and is received by the IR pulse receiver 5 of the handset. The shift of the PPM pulses amounts to approximately +30 $\mu$s.

The transmission of special characters between the hand set and the base set has not yet been implemented in the art discussed above.

SUMMARY OF THE INVENTION

The object of the present invention is to provide a calling means with which special characters can be securely transmitted from the hand set to the base set by way of an optical transmission channel.

Beginning with a telephone subscriber station of the type generally mentioned above, the above object is achieved, according to the present invention, in that a calling device having a controllable pulse generator is provided in the primary set, the pulse generator transmitting an allocated pulse frequency via the second IR pulse transmitter for each special character, and in that a frequency recognition circuit is provided in the base set which recognizes this pulse frequency and emits a signal at its output which corresponds to the special character.

The advantages achieved in practicing the present invention are that a rapid and secure transmission of special characters which, for example, render the coacceptance or interruption of the telephone connection possible extending from the hand set can be achieved with little circuit expense.

In the transmission of such characters, it is advantageous that one's own telephone receiver be switched off, since the transmission of special characters is connected with disruptive noise.

According to a further development of the invention, it is advantageous to provide a monitoring means in the base set which emits an error signal given a disrupted connection between the hand set and the base set.

It is likewise advantageous for practical operation when the monitoring circuit responds given the transmission of special characters. By so doing, it is prevented that disruptive noises arrive on the subscriber line.

It is likewise advantageous for practical operation when a timing element is connected to the monitoring means, by way of which the telephone connection is disconnected given a connection which is disrupted for a longer time.

It is also meaningful when, given actuation of an end key, the power supply of the hand set is not switched off until after the communication of a corresponding special character.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a block diagram of a hand set constructed in accordance with the present invention;

FIG. 4 is a block diagram of the receiving portion of a base set constructed in accordance with the present invention;

FIG. 5 is a block diagram of an exemplary embodiment of a frequency recognition circuit; and FIG. 6 illustrates an exemplary embodiment of the circuit for performing the monitoring function.

DESCRIPTION OF THE PREFERRED EMBODIMENTS

Figure 1:
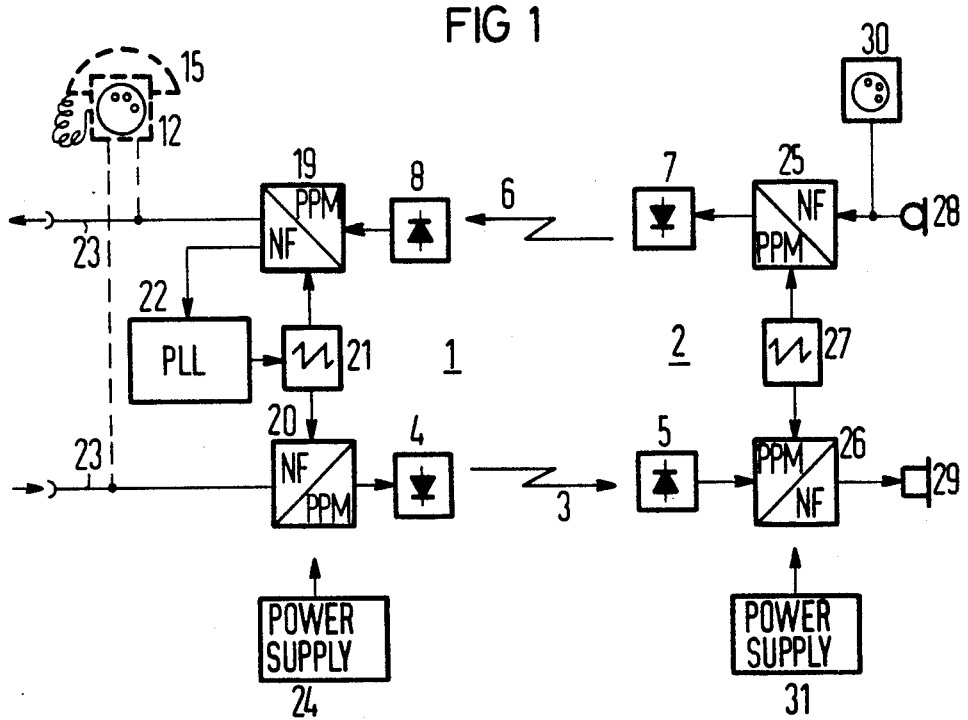
FIG. 1 is a block diagram of a known hand set and base set system.
Figure 2:
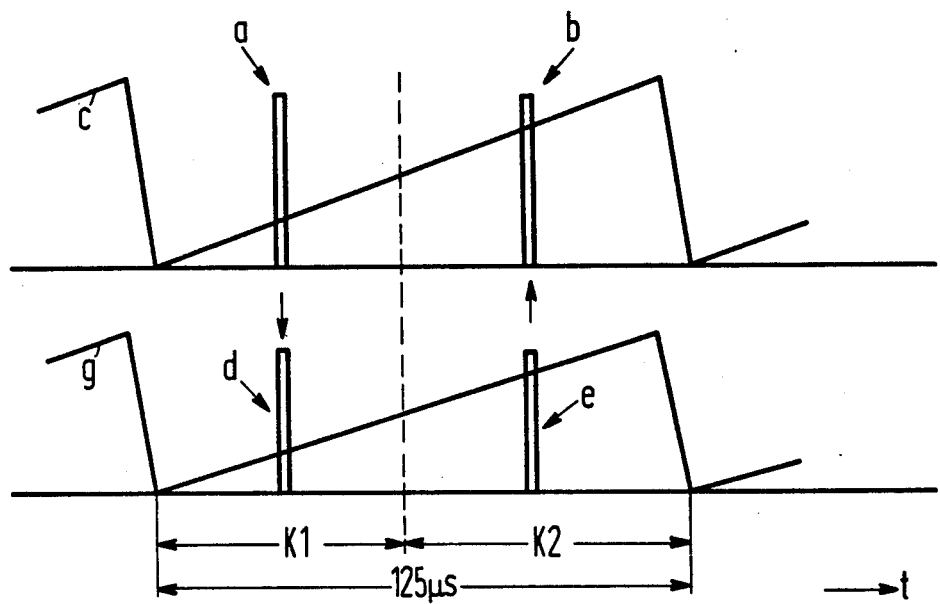
FIG. 2 is a pulse diagram relating to the structure of FIG. 1.

Referring now to FIG. 3, the hand set HA1 is identical in its significant portions to the hand set 2 of FIG. 1. The original sawtooth generator 27 is replaced by means of a controllable pulse generator IG and a sawtooth transducer SW. The original call means 30 is replaced by a call means RU. The call means RU, for example, consists of a plurality of keys T1-T4 and the pulse generator IG controlled by these keys. A commercially-available RC generator or an astable multivibrator is employed, for example, as the pulse generator.

Frequency-determining capacitors of different size are connected by way of the keys T1-T4. A monostable flip-flop is employed in order to form short output pulses. In addition, a transfer switch SO is provided which either through-connects the output of the NF/PPM converter 25 or the output of the pulse generator IG to the IR pulse transmitter 7. The telephone receiver 29 of the hand set can also be switched off by way of a further switch SH. The switches SO and SH are controlled by an AND gate UG whose inputs are connected to the control inputs of the pulse generator IG and are likewise controlled by the keys T1-T4. A time function element MZ is additionally driven by the key T4, the time function element MZ actuating a switch SB after a prescribed time delay and thereby switching off the power supply 31 of the hand set. The battery voltage BS then appears at no circuit of the hand set. Of course, it is likewise possible to only disconnect the battery voltage BS from a few circuits of the hand set.

In the exemplary embodiment, four special characters SZ1-SZ4 are to be transmitted, corresponding to the keys T1-T4. If, for example, the key T1 is actuated, then ground potential is applied to a first control input EG1 of the pulse generator IG. Thereby, the pulse generator changes its output frequency fI. At the same time, ground potential is applied to an input of the AND gate UG upon actuation of a key (inputs not applied to the ground here mean a voltage potential corresponding to a logical "1"). When the output of the AND gate reaches a logical "0", the output of the pulse generator is switched to the IR pulse transmitter 7 via the switch SO and the changed frequency fI corresponding to a special character is transmitted. Simultaneously with the switch SO, the switch SH is also actuated, whereby the telephone receiver 29 in the hand set is switched off. By so doing, the user of the hand set is spared disruptive noise as a rise in the transmission of special characters. Further special characters can be transmitted with the keys T2 and T3. The key T4 is here designated as an end key. Upon its actuation, a changed frequency fI is first transmitted, whereby the telephone connection is disconnected and, subsequently, the connection between the hand set and the base set is interrupted.

The receiving portion of the new base set GR1 of the telephone subscriber station is illustrated in FIG. 4. The receiving portion comprises, as already in the base set 1 described with respect to FIG. 1, an IR pulse receiver 8, a PPM/NF converter 19 connected thereto, a delay circuit 22 and a sawtooth generator 20. Added thereto, in the new base set GR1, are the frequency recognition circuit EF, the monitoring set UE and the time function element ZG connected thereto. The other components serve for illustrating various operating functions given a transmission of special characters.

The frequency recognition circuit EF is connected to the output of the IR pulse receiver 8. The received pulses PPE are supplied to an input EE. When a special character is received, the frequency recognition circuit emits a signal at its output AE1-AE4 which correspond to the special character. If, for example, the special character SZE is received, then a relay R3 is driven via the output AE3 of the frequency recognition circuit EF and the appertaining contact ar2 are actuated by the special character Z2. By so doing, for example, one's secretary can be called or the "ground key" can be actuated. The reception of the special character SZ4 causes a disconnection of the telephone connection. Thereby, the signal wave form proceeds from the output AE4 of the frequency recognition circuit EF to the relay R4 by way of an OR gate OG whose second input is connected to the output of the time function element. The contact ar4 belonging to the relay causes the disconnection of the connection. The JK flip-flop KB is likewise reset with the special character SZ4 by way of the reset input RK, and, therefore, the monitoring receiver MH which may potentially be connected is disconnected. The terminals of the relays R2-R4 are referenced B and are connected to an operating voltage.

The input of the monitoring circuit UE is connected to an output of the delay circuit 22. If no synchronization exists between the received pulses PPE and the set's own sawtooth generator 21, then the monitoring circuit emits an error signal UF. By so doing, the switching means ST is disconnected and no further disruptions can arrive from the base set onto the subscriber line 23. The error signal UF is simultaneously fed to the input of the time function element ZG. If it exists over a longer time, the time function element emits a pulse (after a predetermined time) which disconnects the telephone connection via the OR gate OG and the relay R4.

The error signal UF is fed by way of a second time function element ZE to an additional input SF of the frequency recognition circuit EE. If a special character SZ1-SZ4 is received, the monitoring circuit UE emits the error signal UF. After a short time delay, a pulse is formed by the time function element ZE, the pulse activating the frequency recognition circuit EF. It emits a signal corresponding to the special character at its outputs AE1-AE4. Subsequently, the frequency recognition circuit is again shut off. By this measure, an undesired response of the frequency recognition circuit is avoided.

An advantageous circuit arrangement for the frequency recognition circuit EF is illustrated in FIG. 5. The input EE of the frequency recognition circuit is connected to a triggerable multivibrator at whose output respectively one series connection of the band pass filter having a voltage comparator and a following monostable flip-flop is connected. This device is provided for each frequency corresponding to a special character. In FIG. 5, the frequency recognition portion consisting of the band pass filter, the comparator and the monostable flip-flop has only been illustrated for two different frequencies. The pulse sequence PPE emitted by the IR receiver 8 controls the triggerable multivibrator MT whose output signal has the same frequency as the input signal, but, however, exhibits a mark-to-space ratio 1:1. When a frequency corresponding to the special character SZ1 is received, the same is filtered out by the band pass filter BP1. The voltage comparator KS1 connected to the filter again converts this frequency into a pulse sequence which is supplied to the triggerable monostable flip-flop MS1. The retriggerable monostable flip-flop MS1 again converts the pulse sequence emitted by the voltage comparator into a continuous signal which is supplied at the output AE1. The special characteristics corresponding to other features are decoded in the same manner.

An exemplary circuit for the monitoring circuit UE is illustrated in FIG. 6. The monitoring circuit consists of a peak value rectifier having an attached voltage comparator. The input EU of the monitoring circuit UE is fed to a rectifier DU at whose output a charging capacitor CU is connected having a resistor RU connected in parallel. An input of a voltage comparator KU is likewise connected to the output of the rectifier, the second input of the voltage comparator KU lying at a comparison voltage UK. The phase synchronization circuit 22 in the base set advantageously comprises a phase locked loop. The input of the monitoring circuit is connected to the output of the low pass filter in the loop of the phase locked loop. When the range of control of the phase synchronization circuit 22 is exceeded, a high voltage appears at the input of the monitoring circuit. By way of a rectifier DU, the monitoring circuit through-connects the voltage comparator KU which emits the error signal UF at its output AU.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim

1. In a telephone subscriber station of the type which has a cordless hand set and a base set for connection to a telephone network, a first transmission path including a first low frequency/pulse phase modulation converter and a first infrared transmitter in the base set connected via a first optical channel to a first infrared pulse receiver and a first pulse phase modulation/low frequency converter in the hand set, and a second transmission path including a second low frequency/pulse phase modulation converter and a second infrared transmitter in the hand set connected via a second optical channel to a second infrared receiver and a second pulse phase modulation/low frequency converter in the base set in which first and second sawtooth generators are provided in the base set and hand set, respectively connected to drive the two converters of the respective base and hand sets, in which a phase synchronization circuit is provided in the base set connected between the second pulse phase modulation/low frequency converter and the first sawtooth generator for phase synchronization, and in which a calling device is provided in the hand set connected to the second low frequency/pulse phase modulation converter, the improvement comprising:

a controllable pulse generator in the calling device operable to drive the second low frequency/pulse phase modulation converter and second infrared transmitter to produce a plurality of pulse frequencies, each representing a respective special character; and a frequency recognition circuit in the base set connected to the second infrared receiver, including a plurality of outputs, and operable to emit a signal on a respective output in response to the received pulse frequency.

2. The improved telephone subscriber station of claim 1, wherein the hand set includes a telephone receiver connected to the first pulse phase modulation/low frequency converter, and further comprising:

switching means interposed between the telephone receiver and the first pulse phase modulation/low-frequency converter and connected to and operated by the calling device to disconnect the telephone receiver during the transmission of a special character.

3. The improved telephone subscriber station of claim 1, and further comprising:

a monitoring circuit in the base set connected to the phase synchronization circuit and to the first sawtooth generator for producing an error signal in response to a lack of synchronization.

4. The improved telephone subscriber station of claim 1, and further comprising:

a monitoring circuit in the base set connected to the phase synchronization circuit and the first sawtooth generator and operable in response to the changed frequency of the received pulses, upon receipt of a special character, to emit an error signal.

5. The improved telephone subscriber station of claim 4, and further comprising:

switching means connected between the telephone network and the second pulse phase modulation/low frequency converter and connected to said monitoring circuit and operable in response to an error signal to disconnect the base set from the telephone network.

6. The improved telephone subscriber station of claim 4, and further comprising:

a timing circuit connected to said monitoring circuit and operable in response to an error signal of a predetermined duration to emit a disconnect signal; and disconnect switching means connected between said timing circuit and the telephone network and responsive to a disconnect signal to disconnect the base set.

7. The improved telephone subscriber station of claim 6, and further comprising:

a further timing circuit connected between said monitoring circuit and said frequency recognition circuit and operable after a predetermined time delay after the occurrence of an error signal to activate said frequency recognition circuit to provide a corresponding output signal.

8. The improved telephone subscriber station of claim 7, and further comprising:

a power supply;

an actuatable key in said controllable pulse generator;

switching means connected between said power supply and the powered elements of said hand set; and a time delay circuit connected between said key and said switching means and responsive to operation of said key to switch off said power supply after a predetermined interval following actuation of said key.

9. The improved telephone subscriber station of claim 4, wherein said monitoring circuit comprises:

an input;

a rectifier connected to said input;

a capacitor connected in series with said rectifier;

a resistor connected in parallel with said capacitor; and a voltage comparator including a first input connected to a reference voltage and a second input connected to the junction of said rectifier, said capacitor and said resistor.

10. The improved telephone subscriber station of claim 1, wherein said frequency recognition circuit comprises:

an input;

a triggerable multivibrator connected to said input;

a plurality of band pass filters connected to said multivibrator, each of said filters having a pass band corresponding to a respective special character;

a plurality of voltage comparators, each connected to a respective band pass filter; and a plurality of monostable flip-flops each connected to a respective band pass filter and each having an output constituting an output of said frequency recognition circuit.

11. The improved telephone subscriber station of claim 9, and further comprising:

a plurality of digital filters; and a plurality of monostable flip-flops connected to said digital filters to constitute the frequency recognition circuit.

* * * * *